US009968919B2

(12) United States Patent
Burdeniuc et al.

(10) Patent No.: US 9,968,919 B2
(45) **Date of Patent: *May 15, 2018**

(54) REDUCING EMISSIONS IN POLYURETHANE FOAM

(75) Inventors: Juan Jesus Burdeniuc, Colmar, PA (US); Courtney Thompson Thurau, Harleysville, PA (US); Renee Jo Keller, Orwigsburg, PA (US); Allen Robert Arnold, Catasauqua, PA (US)

(73) Assignee: Evonik Degussa GmbH, Essen (DE)

( * ) Notice: Subject to any disclaimer, the term of this patent is extended or adjusted under 35 U.S.C. 154(b) by 145 days.

This patent is subject to a terminal disclaimer.

(21) Appl. No.: 13/486,226

(22) Filed: Jun. 1, 2012

(65) Prior Publication Data

US 2013/0137787 A1 May 30, 2013

Related U.S. Application Data

(60) Provisional application No. 61/502,570, filed on Jun. 29, 2011.

(51) Int. Cl.

| | |
|---|---|
| ***B01J 31/04*** | (2006.01) |
| ***B01J 31/02*** | (2006.01) |
| ***C08G 18/48*** | (2006.01) |
| ***C08G 18/63*** | (2006.01) |
| ***C08G 18/18*** | (2006.01) |
| ***C08G 18/40*** | (2006.01) |
| *C08G 101/00* | (2006.01) |

(52) U.S. Cl.

CPC ........... *B01J 31/04* (2013.01); *B01J 31/0237* (2013.01); *B01J 31/0238* (2013.01); *B01J 31/0244* (2013.01); *B01J 31/0249* (2013.01); *C08G 18/1875* (2013.01); *C08G 18/4072* (2013.01); *C08G 18/4841* (2013.01); *C08G 18/632* (2013.01); *B01J 2231/14* (2013.01); *C08G 2101/0008* (2013.01); *C08G 2101/0083* (2013.01); *C08G 2290/00* (2013.01)

(58) Field of Classification Search

CPC .... B01J 31/0237; B01J 31/0238; B01J 31/04; C08G 18/1875

USPC .......................................................... 502/170

See application file for complete search history.

(56) References Cited

U.S. PATENT DOCUMENTS

| | | | | |
|---|---|---|---|---|
| 4,066,580 | A | 1/1978 | Falkenstein et al. | |
| 4,394,491 | A | 7/1983 | Hoffman | |
| 5,233,039 | A | 8/1993 | Listemann et al. | |
| 5,464,560 | A | 11/1995 | Schilling et al. | |
| 6,387,972 | B1 | 5/2002 | Ghobary et al. | |
| 6,432,864 | B1 | 8/2002 | Wendel et al. | |
| 6,576,682 | B2 * | 6/2003 | Eyrisch et al. | 521/123 |
| 6,747,069 | B1 | 6/2004 | Burdeniuc | |
| 6,858,654 | B1 | 2/2005 | Wendel et al. | |
| 7,351,859 | B2 | 4/2008 | Grigsby, Jr. et al. | |
| 8,552,078 | B2 | 10/2013 | Vedage et al. | |
| 2005/0027002 | A1 | 2/2005 | Gribsby, Jr. et al. | |
| 2007/0197760 | A1 | 8/2007 | Kometani et al. | |
| 2008/0269365 | A1 * | 10/2008 | Andrew et al. | 521/124 |
| 2011/0014480 | A1 | 1/2011 | Fader | |
| 2014/0113984 | A1 * | 4/2014 | Burdeniuc et al. | 521/131 |

FOREIGN PATENT DOCUMENTS

| | | | |
|---|---|---|---|
| CN | 1621426 | A | 6/2005 |
| CN | 1795162 | A | 6/2006 |
| CN | 101835820 | A | 9/2010 |
| KR | 1020000023271 | A | 4/2000 |
| KR | 20080034798 | A | 4/2008 |
| KR | 1020110007116 | | 1/2011 |
| WO | 01/58976 | A1 | 8/2001 |
| WO | 03/016372 | A1 | 2/2003 |
| WO | 03/016373 | A1 | 2/2003 |
| WO | 03/055930 | A1 | 7/2003 |
| WO | 2004/060956 | A1 | 7/2004 |
| WO | 2006/116456 | A1 | 11/2006 |
| WO | 2008/089411 | A1 | 7/2008 |
| WO | 2009/115540 | A2 | 9/2009 |
| WO | 2009115540 | A2 | 9/2009 |

* cited by examiner

*Primary Examiner* — Michael M Dollinger

(74) *Attorney, Agent, or Firm* — Andrew H. Chung; Linda S. Li; Jason S. Ngui

(57) ABSTRACT

This invention disclosure relates to a process to make flexible open cell polyurethane foam with optimum mechanical properties and lowest chemical emissions. Using the selection of tertiary amine catalysts together with a group of carboxylic acids according to this disclosure can produce foam products with optimum properties and lowest chemical emanations.

9 Claims, No Drawings

REDUCING EMISSIONS IN POLYURETHANE FOAM

CROSS-REFERENCES TO RELATED APPLICATIONS

This application claims the benefit of U.S. Application No. 61/502,570, filed on Jun. 29, 2011. The disclosure of Application No. 61/502,570 is hereby incorporated by reference.

BACKGROUND OF THE INVENTION

The instant invention relates to a process for making open cell flexible polyurethane foam that comprises selecting certain carboxylic acids in combination with a specific group of tertiary amines gelling catalysts having isocyanate reactive groups to produce foam with relatively low chemical emissions.

The production of open cell flexible polyurethane foam requires the use of a variety of additives and each one of them plays a key role in determining the final characteristics and physical properties of the product. Although these additives represent a small percentage in the overall formulation and emissions are expected to be relatively low, the increasing environmental demand for low volatile organic contents (VOC's) in finished products has placed additional requirements on additives for lower emissions while maintaining foam performance. Thus, increased scrutiny of emissions related to catalysts, surfactants and any other component present in polyurethane foam formulation have become more common and this tendency is now global. Polyurethane manufacturers need additives with no emissions that can perform as well as the conventional less environmentally friendly standard products. It is well known that the conventional manufacture procedure to make polyurethane foams requires the use of additives that are emissive. Tertiary amines such as triethylenediamine and bis(dimethylaminoethyl)ether are common standards used by the industry to produce polyurethane foams. The speed of production and final physical properties are a reflection of the catalyst combination. Although these catalysts are widely used, there are several environmental and quality issues resulting from the volatility of these products.

One of the strategies used to reduce emissions from foam was based on introducing functional groups on tertiary amine catalysts able to react with isocyanate functionality. Using this approach, the tertiary amine catalysts would remain covalently bonded to the polyurethane polymer preventing its release into the environment. This approach can have some limitations because the functionalized tertiary amine can react with isocyanate prematurely causing undesired side effects such as polymer chain termination which would result in poor physical properties, excessive cell opening or foam collapse or excessive cross linking which can result in extensive shrinkage and poor dimensional stability. Another alternative approach to reduce odor and emissions is based on utilizing materials with increasing molecular weight and/or polarity. Products such as dimethylaminopropyl urea, bis(dimethylaminopropyl)urea, bis(dimethylaminopropyl) amine and N,N-bis(dimethylaminopropyl)-N-(2-hydroxypropyl) amine can provide acceptable physical properties as compared to industry standards whereas most conventional reactive catalysts cannot always achieve today's consumer and manufacturer requirements. Using these catalysts can reduce significantly the overall emissions from foam. However, the finished articles produced are by no means emissions-free and VOC and (FOG) values can reach several hundred ppm according to VDA 278 detection method.

When making flexible polyurethane foam, carboxylic acids are normally added to the polyurethane formulation to slow down the activity of the tertiary amine and prevent a fast increase in viscosity which allows for a more efficient mold-filling operation particularly in cases where molds with complex shapes and geometries are needed. This approach allows filling of small cavities and voids minimizing the number of defective articles. Acids most commonly used for this purpose are monoacids such as acetic acid, propionic acid, butanoic acid, hexanoic acid, 2-ethylhexanoic acid and the like. These acids, however, are known to be weakly bounded to the polymer thereby causing significant emissions even in the presence of tertiary amines containing isocyanate reactive functionalities. The typical strategy used to minimize emission from acids is similar to that already described for tertiary amine catalysts. In other words, using carboxylic acids containing functional groups able to react with isocyanate can render the carboxylic acid immobilized in the polyurethane polymer. However, this approach has similar limitation as the ones already described for non-emissive tertiary amines. The functionalized carboxylic acid can react with the isocyanate causing undesired effects such as polymer chain termination which would result in poor physical properties, excessive cell opening or foam collapse as well as excessive cross linking which can result in excessive shrinkage and poor dimensional stability depending on the choice of functionalized acid.

US Patent Publication No. US2007/0197760 A1 discloses a catalyst for production of polyurethane which is non-corrosive and exhibits effective delay of catalyst action. The catalysts comprises a mixture of a emissive tertiary amine and a saturated carboxylic acid represented by the general formula HOOC—$(CH_2)_n$—COOH where n is an integer form 2 to 14. However, the combination of catalyst and acid employed in US2007/0197760 A1 lead to foam with high emissions.

U.S. Pat. No. 6,387,972 disclosed an improved process to enhance polyurethane foam performance. Polyurethane foam is prepared by reaction between a polyisocyanate and a polyfunctional isocyanate-reactive component wherein said reactions are conducted in the presence of catalysts composed of (a) a specific reactive tertiary amine catalysts selected form the group consisting of bis(dimethylaminopropyl)amino-2-propanol, bis(dimethylaminopropyl)amine, dimethylaminopropyldipropanolamine, bis(dimethylamino)-2-propanol, N,N,N'-trimethyl-N'-hydroxyethyl-bis (aminoethyl)ether and mixtures thereof; and (b) at least one carboxylic acid salt of the specific reactive tertiary amine compound selected from the group consisting of hydroxyl-carboxylic acid salts and halo-carboxylic acid salts. The hydroxyl carboxylic acid results in lower emissions form foam due to the immobilization caused by its reaction with isocyanate. However, this approach has the disadvantage that excess isocyanate is required to render the acid immobilized and this reaction adversely influence the physical properties of polyurethane foam. Also, the immobilized acid can not freely migrate through the foam making it an ineffective blocking agent.

U.S. Pat. No. 6,432,864 disclosed novel acid-blocked amine catalyst and their use in the preparation of polyurethane foams. The acid-blocked amine catalyst is typically made by combining a tertiary amine with an acid prepared from an organic cyclic anhydride and a glycol. Since the acid produced by the reaction of a glycol with an anhydride yields a product containing a hydroxyl group, polyurethane foam made with this acid requires additional isocyanate to account for the OH group. In addition, the alcohol-acid can stop polymer growth due to the presence of a single hydroxyl group in the molecule which can have a detrimental impact on foam physical properties. Furthermore, the process yields an ester functionality that is hydrolytically unstable causing changing in reactivity as the polyurethane formulation system ages.

U.S. Pat. No. 4,066,580 disclosed a process for the manufacture of urethane groups containing polyisocyanurate foam produced by mixing polyisocyanates and polyols and frothing agents, auxiliaries and additives in the presence of a co-catalysts system which consists of a 1,3,5-tris(N,N-dialkylaminoalkyl)-s-hexahydrotriazine and an organic mono- or polycarboxylic acid, a polyesterol with an acid number greater than 4 or a mono-ester of polycarboxylic acids. In particular, the invention describes a method in which the cream time and rise times can be varied by using a particular catalysts consisting of 1,3,5-tris(N,N-dialkylaminoalkyl)-s-hexahydrotriazine and organic carboxylic acids, monoesters of the acids or polyesterols with acid numbers greater than 4. Thus the invention uses acids and polyacids but with the purpose of controlling the processing conditions of a PIR foam made specifically with 1,3,5-tris(N,N-dialkylaminoalkyl)-s-hexahydrotriazine.

U.S. Pat. No. 7,351,859 disclosed a tertiary amine-carboxylic acid salt, where the carboxylic acid and tertiary amine are selected such that the catalyst salt is blocked at room temperature and becomes unblocked at an elevated temperature. The compound is useful as a heat activated urethane catalyst. This invention disclosure relates specifically to the use of oxalic acid and/or salicylic acid in combination with a certain tertiary amine catalyst which may contain an isocyanate reactive group. This invention is not directed to make humid aged stable and low emission polyurethane foam but rather to a process to make foam in which tertiary amine carboxylate salts of oxalic acid and salicylic acid de-blocked at higher temperatures. The use of Polycat®8, or Polycat®5 would result in foam products with high emissions due to the lack of an isocyanate reactive group. On the other hand, Dabco®, Dabco®DMEA and Jeffcat®ZR70 will result in foam with poor ambient and humid aged physical properties as shown in example 1. Polycat®15 can give foam with acceptable physical properties and emissions. However, Polycat®15 used in combination with oxalic acid can have several environmental issues. Standard emission tests of flexible foam are normally carried out at 120° C. and oxalic acid sublimes at temperatures of 100° C. Therefore, any of these catalyst-oxalic acid combinations generates corrosive emissions which are unacceptable for use, for example, in automotive applications where end consumers could be exposed to acid and corrosive emanations. Oxalic acid is particularly highly corrosive due to it very high acidity (pKa=1.27). This also present a serious issue to the automotive interior because during the summer days temperatures inside a car can be very high causing oxalic acid emissions to corrode metal parts or damage other materials. On the other hand, salicylic acid has the disadvantage of having an isocyanate reactive group which has the limitations of chemical mobility and polymer chain termination discussed above.

U.S. Pat. No. 5,464,560 discloses an organic acid having at least two carboxylic groups, no tertiary amine groups and a pKa of up to 3.1 is added to an HCFC blowing agent or to a composition, preferably an isocyanate-reactive composition in which an HCFC blowing agent is present to reduce decomposition of the HCFC blowing agent. The resultant compositions are useful in the production of polyisocyanurate, polyurethane and/or polyurea foams. The use of organic acid in the presence of volatile HCFC will produce foam with high emission levels highly undesired in open cell flexible foam applications.

U.S. Pat. No. 6,576,682 relates to the combined use of metal salts of ricinoleic acid with reactive amine catalysts in the preparation of polyurethane foams and their solutions in aqueous or organic solvents in the preparation of polyurethane foams in combination with reactive amines. The purpose of the invention is to reduce emissions from volatile acids resulting from the hydrolytic decomposition of tin octoate salts. This patent describes emissions caused by organic carboxylic mono-acids such as 2-ethylhexanoic acid and how by increasing the molecular weight of the acid and incorporating hydroxyl functionality as in ricinoleic acid helped minimizing acid emissions. It also illustrates the fact that using standard organic carboxylic acids of formula R—$CO_2$H in which R is hydrogen or alkyl group can lead to organic emissions from foam.

The disclosure of the previously identified patents and patent application is hereby incorporated by reference.

There is a need in this art for an improved foam and foam manufacturing method that has reduced emissions.

BRIEF SUMMARY OF THE INVENTION

The instant invention solves problems associated with conventional catalysts and methods by reducing the overall emissions form open cell flexible polyurethane foam. The instant invention employs certain tertiary amine catalysts along with certain carboxylic diacids. Such acids comprise at least one member selected from the group consisting of fumaric, malonic, maleic, succinic, glutaric, adipic, pimelic, suberic, azelaic, sebacic, phthalic, isophthalic and therephthalic acids; all of which contain no OH, NH═, $NH_2$—, urea, amide or any other functionality beyond the carboxylic acid functionality. The diacids can be retained in foam and are characterized in that no isocyanate reactive group is present (e.g., minimizing isocyanate consumption and its impact on physical properties).

When these acids are used in combination with tertiary amine gelling catalysts comprising at least one member selected from the group consisting of urea, secondary-amine, primary amine, amide and secondary hydroxyl groups, the foam produced has reduced overall emissions as measured by the VDA 278 method as well as excellent physical properties. Thus, using certain amine catalysts and carboxylic acids according to this invention can permit: a) elimination of emissions originating from the amine catalysts; b) elimination of emissions originating from the carboxylic acid, and c) further overall emission reduction on VOC and FOG when using the acid/amine selection according to the invention.

One aspect of this invention relates to a method to reduce chemical emissions from flexible open-cell foam while maintaining excellent physical properties by using certain carboxylic acids and in particular carboxylic diacids or carboxylic triacids in the presence of a selected group of tertiary amines having the following functionalities: urea, amide, secondary-amine, primary amine or secondary-hydroxyl. The instant invention can produce foam with no tertiary amine or carboxylic acid emissions according to VDA 278 method. The instant invention can also produce a 10% or less overall emissions reduction according to VDA 278 method.

One aspect of this invention relates to a catalyst comprising at least one acid selected from the group consisting of carboxylic diacids and carboxylic triacids, and at least one tertiary amine comprising at least one functionality selected from the group consisting of urea, amide, secondary-amine, primary amine or secondary-hydroxyl and wherein the acid has no isocyanate reactive groups and tertiary amine is substantially free of primary hydroxyl groups.

Another aspect of this invention relates to a catalyst consisting essentially of at least one acid selected from the group consisting of carboxylic diacids and carboxylic triacids, and at least one tertiary amine comprising at least one functionality selected from the group consisting of urea, amide, secondary-amine, primary amine or secondary-hydroxyl.

Further aspect of the invention relates to a process for making polyurethane foams by using the inventive catalyst and to the resultant foams.

DETAILED DESCRIPTION OF THE INVENTION

The instant invention relates to a catalyst and method to minimize foam emissions without compromising foam physical properties. Thus, the process according to the invention uses non-emissive gelling tertiary amine catalysts having at least one of urea, amide, secondary amine, primary amine and secondary hydroxyl groups in the presence of a carboxylic acid selected from the group of fumaric, malonic, maleic, succinic, glutaric, adipic, pimelic, suberic, azelaic, sebacic, phthalic, isophthalic and therephthalic. These combinations can yield foam with low chemical emissions and optimum physical properties.

The instant invention also relates to a process to make low emissions polyurethane foams using a combination of a selected group of isocyanate-reactive tertiary amines gelling catalysts in combination with dicarboxylic acids (or tricarboxylic acids) including fumaric, malonic, maleic, succinic, glutaric, adipic, pimelic, suberic, azelaic, sebacic, phthalic, isophthalic and therephthalic acids. The selected reactive gelling tertiary amines catalysts include any of the following functionalities urea, secondary-amine, primary amine, amides or secondary hydroxyl group. The combination of an isocyante-reactive tertiary amine catalyst together with the carboxylic acids of the invention produces foam with minimal emissions when compared with foam produced with any sole conventional emissive or non-emissive gelling catalyst described in the prior art.

Preparation of Foams

Foams of any of the various types known in the art may be made using the methods of this invention, using typical polyurethane formulations to which have been added the appropriate selected tertiary amine and carboxylic acid. For example, flexible polyurethane foams with the excellent humid aging characteristics described herein will typically comprise the components shown below in Table I, in the amounts indicated. The components shown in Table I will be discussed in detail later below.

TABLE I

| Polyurethane Components | |
|---|---|
| Component | Parts by Weight |
| Base Polyol | 20-100 |
| Polymer polyol | 0-80 |
| Silicone surfactant | 0.5-10 |
| Blowing agent | 2-4.5 |
| Crosslinker | 0.5-2 |
| Catalyst | 0.25-10 |
| Carboxylic acid | 0.05-3.0 |
| Polyisocyanate | To provide NCO index = 70-115 |

The amount of polyisocyanate used in polyurethane formulations according to the invention is not limited, but it will typically be within those ranges known to those of skill in the art. An exemplary range is given in table I, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

$$NCO\ index=[NCO/(OH+NH)]*100$$

Flexible foams typically use copolymer polyols as part of the overall polyol content in the foam composition, along with base polyols of about 4000-5000 weight average molecular weight and hydroxyl number of about 28-35. Base polyols and copolymer polyols will be described in detail later herein.

Catalysts

The catalysts of the present invention comprise and, in order to reduce emissions, consist essentially of tertiary amines containing isocyante reactive groups. Isocyanate reactive groups present in the tertiary amine gelling catalyst consist essentially of primary amine, secondary amine, secondary-hydroxyl group, amide and urea. Examples of gelling catalysts include N,N-bis(3-dimethylamino-propyl)-N-(2-hydroxypropyl)amine; N,N-dimethyl-N',N'-bis(2-hydroxypropyl)-1,3-propylenediamine; dimethylaminopropylamine (DMAPA); N-methyl-N-2-hydroxypropyl-piperazine, bis-dimethylaminopropyl amine (POLYCAT® 15), dimethylaminopropyl urea and N,N'-bis(3-dimethylaminopropyl)urea (DABCO® NE1060, DABCO® NE1070, DABCO® NE1080 and DABCO® NE1082), 1,3-bis(dimethylamino)-2-propanol, 6-dimethylamino-1-hexanol, N-(3-aminopropyl)imidazole, N-(2-hydroxypropyl)imidazol, N,N'-bis(2-hydroxypropyl)piperazine, N-(2-hydroxypropyl)-morpholine, N-(2-hydroxyethylimidazole). Examples of blowing co-catalysts containing isocyanate reactive groups that can be used with the above mentioned gelling catalysts include 2-[N-(dimethylaminoethoxyethyl)-N-methylamino]ethanol (DABCO® NE200), N,N,N'-trimethyl-N'-3-aminopropyl-bis(aminoethyl)ether (DABCO® NE300). The catalyst compositions may also include other components, for example transition metal catalysts such as organotin compounds or bismuth carboxylates for example when the desired polyurethane foam is a flexible slab stock. Metal catalyst can also comprise at least one member selected from the group consisting of dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included.

While the instant invention can be used with amines in addition to those listed above, such usage can increase the emissions from the foam and foam manufacturing method. In addition, the amine will normally be substantially free of primary hydroxyl groups. By "substantially free", it is mean that the inventive gelling catalyst lack primary hydroxyl groups or contain an amount of such groups which is insufficient to significantly affect the foam's physical properties during ageing.

Typically, the loading of reduced emission or non-fugitive tertiary amine catalyst(s) for making foam according to the invention will be in the range of about 0.1 to about 20 pphp, more typically about 0.1 to about 10 pphp, and most typically about 0.1 to about 5 pphp. However, any effective amount may be used. The term "pphp" means parts per hundred parts polyol.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates. While any suitable isocyanate can be used, an example of such comprises isocyanate having an index range from about 80 to about 120 and typically from about 90 to about 110. The amount of isocyanate typically ranges from about 95 to about 105.

Polyol Component

Polyurethanes are produced by the reaction of organic isocyanates with the hydroxyl groups of polyol, typically a mixture of polyols. The polyol component of the reaction mixture includes at least a main or "base" polyol. Base polyols suitable for use in the invention include, as non-limiting examples, polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; hereby incorporated by reference. Suitable polyether polyols also include those containing tertiary amine groups than can catalyze the gelling and the blowing reaction of polyurethanes, for example those described in WO 03/016373 A1, WO 01/58976 A1; WO2004/060956 A1; WO03/016372 A1; and WO03/055930 A1; the disclosure of the foregoing WO publications is hereby incorporated by reference. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures.

In addition to the base polyols described above, or instead of them, materials commonly referred to as "copolymer polyols" may be included in a polyol component for use according to the invention. Copolymer polyols may be used in polyurethane foams to increase the resistance to deformation, for example to improve the load-bearing properties. Depending upon the load-bearing requirements, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Other suitable polyols that can be used according to the invention include natural oil polyols or polyols obtained from renewable natural resources such as vegetable oils. Polyols useful in the preparation of polyurethane foam from inexpensive and renewable resources are highly desirable to minimize the depletion of fossil fuel and other non-sustainable resources. Natural oils consist of triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, transesterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

Polyols amounts are defined by pphp. There are 3 types of polyols above defined: standard polyol or polyether polyol which can be used in the range of about 100 pphp (the only polyol) to about 10 pphp. The copolymer polyol (CPP) can be used in the range of about 0 to about 80 pphp. Finally the NOP (natural oil polyol) which typically can be present from about 0 to about 40 pphp.

Blowing Agents

Polyurethane foam production may be aided by the inclusion of a blowing agent (BA) to produce voids in the polyurethane matrix during polymerization. Any suitable blowing agent may be used. Suitable blowing agents include compounds with low boiling points which are vaporized during the exothermic polymerization reaction. Such blowing agents are generally inert or they have low reactivity and therefore it is likely that they will not decompose or react during the polymerization reaction. Examples of low reactivity blowing agents include, but are not limited to, carbon dioxide, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons such as cyclopentane, isopentane, n-pentane, and their mixtures. Other suitable blowing agents include compounds, for example water, that react with isocyanate compounds to produce a gas. The amount of BA is typically from about 0 (water blown) to about 80 pphp. Water (blow foam by reacting with isocyanate making CO2) can be present in the range from about 0 (if a BA is included) to about 60 pphp (a very low density foam) and typically from about 1.0 pphp to about 10 pphp and, in some cases, from about 2.0 pphp to about 5 pphp.

Other Optional Components

A variety of other ingredients may be included in the formulations for making foams according to the invention. Examples of optional components include, but are not limited to, cell stabilizers, crosslinking agents, chain extenders, pigments, fillers, flame retardants, auxiliary urethane gelling catalysts, auxiliary urethane blowing catalysts, transition metal catalysts, alkali and alkali earth carboxylate salts and combinations of any of these.

Cell stabilizers may include, for example, silicone surfactants as well as organic anionic, cationic, zwiterionic or nonionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like.

Crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof. Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders.

Cell stabilizers can used in an amount from about 0.1 to about 20 pphp and typically from about 0.1 to about 10 pphp and, in some cases, from about 0.1 to about 5.0 pphp. Fire retardants can be used in an amount from about 0 to about 20 pphp and from about 0 to about 10 pphp and from about 0 to about 5 pphp.

Certain aspects of the invention are illustrated by the following Examples. These Examples are illustrative only and shall not limit the scope of any claims appended hereto. Foams were evaluated by using Handmix Evaluations or Machine Evaluations as described below.

EXAMPLES

Handmix Evaluations

Handmix experiments were conducted using the following procedure. Formulations were blended together for approximately 10 minutes using a mechanical mixer equipped with a 7.6 cm diameter high shear mixing blade, rotating at 5000 rpm. Premixed formulations were maintained at 23±1° C. using a low temperature incubator. Mondur TD-80 (an 80/20 2,4/2,6 isomer blend of toluene diisocyanate) or modified MDI was added to the premix at the correct stoichiometric amount for the reported index of each foam. The mixture was blended together with Premier Mill Corporation Series 2000, Model 89, and dispersed for approximately five seconds. The foaming mixture was transferred to an Imperial Bondware #GDR-170 paper bucket and allowed to free rise while data was recorded.

Machine Evaluations

Machine runs for the flexible molded foam were conducted on a Hi Tech Sure Shot MHR-50, cylinder displacement series and high-pressure machine. Fresh premixes, consisting of the appropriate polyols, water, crosslinker, surfactants and catalysts for each formulation were charged to the machine. Mondur TD-80 was used throughout the entire study. All chemical temperatures were held at 23±2° C. via the machine's internal temperature control units. Foam pours were made into an isothermally controlled, heated aluminum mold maintained at 63±2° C. The mold was a typical physical property tool designed with internal dimensions of 40.6 cm×40.6 cm×10.2 cm. The mold has five vents, each approximately 1.5 mm in diameter, centered in each corner 10.0 cm from each edge and the geometric center of the lid. The mold was sprayed with a solvent-based release agent, prior to every pour and allowed to dry for one minute before pouring. The foam premix was puddle poured into the center of the mold with a wet chemical charge weight capable of completely filling the mold and obtaining the desired core densities reported. Minimum fill requirements were established for each formulation evaluated. The foam article was demolded at 240 seconds (4 minutes) after the initial pour (detailed in next paragraph). Upon demold, the foam was placed through a mechanical crusher or tested for Force-to-Crush (FTC) measurements or allow to cool down to determine dimensional stability (detailed below).

Foam made with each catalyst set were mechanically crushed 1 minute after demold using a Black Brothers Roller crusher set to a gap of 2.54 cm. Crushing was conducted three times on each part, rotating the foam 90 degrees after each pass through the rollers. All parts produced for physical testing were allowed to condition for at least seven days in a constant temperature and humidity room (23±2° C., 50±2% relative humidity).

FTC measurements were conducted 45 seconds after demold. The pad was removed from the mold, weighed and placed in the FTC apparatus. The force detection device is equipped with a 2.2 kg capacity pressure transducer mounted between the 323 $cm^2$ circular plate cross head and the drive shaft. The actual force is shown on a digital display. This device mimics the ASTM D-3574, Indentation Force Deflection Test and provides a numerical value of freshly demolded foam's initial hardness or softness. The pad was compressed to 50 percent of its original thickness at a cross-head velocity of 275 mm per minute with the force necessary to achieve the highest compression cycle recorded in Newton's. Ten compression cycles were completed. A cycle takes approximately 30 seconds to complete.

Example 1

Selection of Tertiary Amine Catalyst Having Isocyanate Reactive Group

Foam pads were prepared by adding a tertiary amine catalyst to about 302 g of a premix (prepared as in Table 2) in a 32 oz (951 ml) paper cup. The formulation was mixed for about 10 seconds at about 6,000 RPM using an overhead stirrer fitted with a 2-inch (5.1 cm) diameter stirring paddle.

The toluene diisocyanate was then added, and the formulation was mixed well for about another 6 seconds at about 6,000 RPM using the same stirrer, after which it was poured into a pre-heated mold at 70° C. and demolded after 4 minutes. The foam pads were removed from the mold, hand crushed, weighed and machine crushed at 75% pad thickness. Foam pads were stored under constant temperature and humidity conditions for 48 hours before being cut and tested.

TABLE 1

| PREMIX COMPONENTS | |
|---|---|
| Component | #1 PPHP |
| SPECFLEX ® NC 630[1] Polyol | 50 |
| SPECFLEX ® NC 700[2] Polyol | 50 |
| Water | 3.0 |
| DABCO ® DC6070[3] low emissions silicon surfactant | 0.60 |
| Catalyst | Varied |
| Diethanolamine (crosslinker) | 0.70 |
| Toluene diisocyanate | To provide NCO index = 100 |

[1]High functionality capped polyether polyol of high molecular weight, functionality, and primary hydroxyl content with a base polyol molecular weight of about 5500, available from Dow Chemical Company, Midland, MI.
[2]Grafted polyether polyol containing copolymerized styrene and acrylonitrile, base polyol molecular weight about 4800, available from Dow Chemical Company, Midland, MI.
[3]Silicone surfactant is available from Air Products and Chemicals, Inc.
[4] The amine catalyst is available from Air Products and Chemicals, Inc.

The toluene diisocyanate was then added, and the formulation was mixed well for about another 6 seconds at about 6,000 RPM using the same stirrer, after which it was poured into a pre-heated mold at 70° C. and demolded after 4 minutes. The foam pads were removed from the mold, hand crushed, weighed and machine crushed at 75% pad thickness. Dimensional stability (foam shrinkage) was evaluated by allowing the foam pads to cool down and observing whether shrinkage or not took place. Foam pads were stored under constant temperature and humidity conditions for 48 hours before being cut and tested.

Table 2 shows the ambient physical properties of flexible molded polyurethane pads for gelling catalysts with different molecular structures and isocyanate reactive functionalities. The flexible molded pads were made using a single gelling amine catalyst to show the influence of each individual structure on physical properties. The blowing catalyst was in each case DABCO® NE300 (N,N,N'-trimethyl-N'-3-aminopropyl-bis(aminoethyl)ether). The evaluation shows that gelling catalysts containing isocyanate reactive groups such as urea (—$NHCONH_2$ or —NHCONH—) or amine (=NH or $NH_2$) and secondary hydroxyl groups ($R_2CH$—OH) give foams with acceptable physical properties. However, gelling catalysts containing primary hydroxyl groups give foams with poor physical properties as evidenced by very high 50% compression set (50% CS) of Dabco® T (catalyst 7 in table 2) and Polycat®17 (catalyst 6 in table 2 and 3). Gelling catalyst dimethylaminoethoxyethanol (catalyst 3 in table 2 and 3) showed good physical properties under ambient conditions however under humid aged conditions (Table 3) complete loss of mechanical integrity is observed as evidenced by the extremely low values of humid aged tensile strength and elongation and high 50% compression set. A similar trend is observed with other gelling catalysts containing primary hydroxyl group functionalities such as DABCO® (catalyst 7 in table 2 and 3; N-dimethylaminoethyl-N-(2-hydroxyethyl)-N-methylamine) and Polycat®17 (catalyst 6 in table 2 and 3; N-dimethylaminopropyl-N-(2-hydroxyethyl)-N-methylamine). Thus, the isocyante reactive groups present in the tertiary amine gelling catalyst should contain the following functionalities: a) amine groups (=NH or —$NH_2$), b) ureas (—$NHCONH_2$, —NHCONH—), c) secondary hydroxyl groups ($R_2CH$—OH) d) amides. Gelling catalysts containing primary hydroxyl groups will produce foam that will undergo extensive physical properties deterioration during ageing.

TABLE 2

PHYSICAL PROPERTIES AT AMBIENT DATA

| Catalyst | Tear (lbf) | Tensile (psi) | Elongation (%) | Airflow (SCFM) | 50% CS Height Loss | Density (lb/cuft) |
|---|---|---|---|---|---|---|
| Triethylenediamine (1) | 1.63 | 17.4 | 99.3 | 2.31 | 8.21 | 1.89 |
| Bis(dimethylaminopropyl) amine (2) | 1.27 | 14.3 | 82.1 | 1.94 | 11.86 | 1.95 |
| Dimethylaminoethoxyethanol (3) | 1.40 | 15.3 | 151.7 | 1.74 | 6.18 | 1.87 |
| Dimethylaminopropylureas (mono and bis mixture) (4) | 1.26 | 15.0 | 158.9 | 2.12 | 4.96 | 1.84 |
| N,N-bis(dimethylamino propyl)-N-(2-hydroypropyl)amine (5) | 1.54 | 15.7 | 155.8 | 1.78 | 4.83 | 1.86 |
| N-dimethylaminopropyl-N-(2-hydroxyethyl)-N-methylamine (6) | 1.37 | 16.3 | 94.4 | 2.11 | 40.9 | 1.81 |

TABLE 2-continued

PHYSICAL PROPERTIES AT AMBIENT DATA

| Catalyst | Tear (lbf) | Tensile (psi) | Elongation (%) | Airflow (SCFM) | 50% CS Height Loss | Density (lb/cuft) |
|---|---|---|---|---|---|---|
| N-dimethylaminoethyl-N-(2-hydroxyethyl)-N-methylamine (7) | 1.55 | 17.0 | 105.8 | 2.02 | 43.7 | 1.80 |

TABLE 3

PHYSICAL PROPERTIES UNDER HUMID AGEING CONDITIONS

| Catalyst | Humid Aged Elongation (%) | Humid Aged Tensile (psi) | Humid Aged 50% CS |
|---|---|---|---|
| Triethylenediamine (1) | 67.5 | 5.00 | 5.34 |
| Bis(dimethylaminopropyl) amine (2) | 35.31 | 2.56 | 10.5 |
| Dimethylaminoethoxyethanol (3) | 17.6 | 0.2 | 45.6 |
| Dimethylaminopropylureas (mono and bis mixture) (4) | 46.0 | 1.78 | 11.2 |
| N,N-bis(dimethylaminopropyl)-N-(2-hydroypropyl)amine (5) | 52.2 | 2.29 | 9.4 |
| N-dimethylaminopropyl-N-(2-hydroxyethyl)-N-methylamine (6) | 17.3 | 0.30 | 40.7 |
| N-dimethylaminoethyl-N-(2-hydroxyethyl)-N-methylamine (7) | 15.7 | 0.18 | 48.9 |

Example 2

Emissions Measured on Foam Made with Standard Amine Catalysts Having No Isocyanate Reactive Group Foam pads were prepared by adding a tertiary amine catalyst to about 302 g of a premix (prepared as in Table 4) in a 32 oz (951 ml) paper cup. The formulation was mixed for about 10 seconds at about 6,000 RPM using an overhead stirrer fitted with a 2-inch (5.1 cm) diameter stirring paddle.

The toluene diisocyanate was then added, and the formulation was mixed well for about another 6 seconds at about 6,000 RPM using the same stirrer, after which it was poured into a pre-heated mold at 70° C. and demolded after 4 minutes. The foam pads were removed from the mold, hand crushed, weighed and machine crushed at 75% pad thickness. Dimensional stability (foam shrinkage) was evaluated by allowing the foam pads to cool down and observing whether shrinkage or not took place. Foam pads were stored under constant temperature and humidity conditions for 48 hours before being cut and tested.

TABLE 4

PREMIX COMPONENTS

| Component | #1 PPHP |
|---|---|
| SPECFLEX ® NC 630[1] | 50 |
| SPECFLEX ® NC 700[2] | 50 |
| Water | 3.0 |

TABLE 4-continued

| PREMIX COMPONENTS | |
|---|---|
| Component | #1 PPHP |
| DABCO ® DC6070[3] | 0.60 |
| Triethylenediamine (33% solution in MP-diol) (Gelling catalyst) | 0.30 |
| Bis(dimethylaminoethyl) ether, 70% solution in DPG (Blowing catalyst) | 0.10 |
| Diethanolamine (crosslinker) | 0.70 |
| Toluene diisocyanate | To provide NCO index = 100 |

[1]High functionality capped polyether polyol of high molecular weight, functionality, and primary hydroxyl content with a base polyol molecular weight of about 5500, available from Dow Chemical Company, Midland, MI.
[2]Grafted polyether polyol containing copolymerized styrene and acrylonitrile, base polyol molecular weight about 4800, available from Dow Chemical Company, Midland, MI.
[3]Silicone surfactant available from Air Products and Chemicals, Inc.
[4] Amine catalyst available from Air Products and Chemicals, Inc.

Emission from foam was measured using thermodesorption analysis and the substances emitted at 90° C. (VOC) and 120° C. (FOG) were quantified according to VDA 278 method. For this purpose a sample of the test material is heated in a current of inert gas, and the substances released are frozen out in the refrigerated injector of the gas chromatograph. The mixtured is then passed through the gas chromatographic column and the total emissions quantified. The VOC and FOG are measured with the same sample. Quantification of the gaseous emissions (VOC) is made against an external toluene standard while the condensable emissions (FOG) are quantified against hexadecane (C16-n-alkane). The concentrations are reported in ppm as total emissions in toluene and hexadecane equivalents.

TABLE 5

POLYURETHANE FOAM EMISSIONS MADE WITH STANDARD AMINE CATALYSTS HAVING NO ISOCYANATE REACTIVE GROUPS

| Type of Emission | Measured Value (ppm) |
|---|---|
| VOC | 801 |
| FOG | 90 |
| Total Emissions | 891 |

Example 3

Polyurethane Emissions from Foam Made with Standard Amine Catalysts Blocked with Conventional Acid 2-Ethylhexanoic Acid Foam pads were prepared according to example 2 but in this case 2-ethylhexanoic acid was used in the polyurethane formulation as shown in foam specimens #2.

| Component | #2 PPHP |
|---|---|
| Triethylenediamine (33% solution in MP-diol) (Gelling catalyst) | 0.40 |
| Bis(dimethylaminoethyl) ether, 70% solution in DPG (Blowing catalyst) | 0.10 |
| 2-Ethylhexanoic acid | 0.54 |
| Toluene diisocyanate | To provide NCO index = 100 |

Foam test showed that emissions from the mono carboxylic acid significantly impact the total VOC and FOG of the finished product.

TABLE 6

EMISSIONS FROM FOAM MADE WITH STANDARD AMINE CATALYSTS AND MONO CARBOXYLIC ACID

| Type of Emission | Measured Value (ppm) 2-Ethylhexanoic acid |
|---|---|
| VOC | 727 |
| FOG | 257 |
| Total Emissions | 984 |

Example 4

Polyurethane Emissions from Foam Made with Standard Amine Catalysts Blocked with Malonic Acid Foam pads were prepared according to example 2 but in this case malonic acid was added to the polyurethane formulation.

| Component | #3 PPHP |
|---|---|
| Triethylenediamine (33% solution in MP-diol) (Gelling catalyst) | 0.40 |
| Bis(dimethylaminoethyl) ether, 70% solution in DPG (Blowing catalyst) | 0.10 |
| Malonic Acid | 0.048 |
| Toluene diisocyanate | To provide NCO index = 100 |

Foam test showed that emissions in the presence or absence of malonic acid when using emissive catalysts are similar.

TABLE 6

EMISSION FROM FOAM MADE WITH STANDARD AMINE CATALYST AND MALONIC ACID

| Type of Emission | Measured Value (ppm) |
|---|---|
| VOC | 791 |
| FOG | 91 |
| Total Emissions | 882 |

Example 5

Polyurethane Emissions from Foam Made with Amine Catalysts Containing Isocyane Reactive Groups Foam pads were prepared according to example 1 but in this case malonic acid was added to the polyurethane formulation.

| Component | #4 PPHP |
|---|---|
| Dimethylaminopropylureas (mono and bis mixture) (Gelling catalyst) | 0.70 |
| 2-[N-(dimethylaminoethoxyethyl)-N-methylamino]ethanol (Blowing catalyst) | 0.17 |
| Toluene diisocyanate | To provide NCO index = 100 |

Foam test showed, as expected, emissions reduction when using tertiary amine catalysts containing isocyanate reactive groups.

TABLE 7

EMISSIONS FROM FOAM MADE WITH AMINE CATALYSTS HAVING ISOCYANATE REACTIVE GROUPS

| Type of Emission | Measured Value (ppm) |
|---|---|
| VOC | 339 |
| FOG | 101 |
| Total Emissions | 440 |

Example 6

Emissions from Foam Made with Amine Catalysts Containing Isocyane Reactive Groups and Selected Acids The following table summarizes the use levels of catalyst and organic acid employed in the preparation of foam samples.

| Component | #5 PPHP | #6 PPHP | #7 PPHP |
|---|---|---|---|
| Dimethylaminopropylureas (mono and bis mixture) | 0.70 | 0.70 | 0.70 |
| 2-[N-(dimethylaminoethoxyethyl)-N-methylamino]ethanol | 0.17 | 0.17 | 0.17 |
| Malonic Acid | 0.196 | — | — |
| Maleic Acid | — | 0.220 | — |
| Succinic Acid | — | — | 0.224 |
| TDI Index | 100 | 100 | 100 |

TABLE 8

OVERALL EMISSIONS REDUCTION ACHIEVED WITH DIFFERENT SOME REPRESENTATIVE DIACIDS

| Type of Emission | #1 ppm | #2 ppm | #3 ppm | #4 ppm | #5 ppm Malonic | #6 ppm Maleic | #7 ppm Succinic |
|---|---|---|---|---|---|---|---|
| VOC | 801 | 727 | 791 | 339 | 301 | 314 | 305 |
| FOG | 90 | 257 | 91 | 101 | 97 | 93 | 107 |
| Total Emissions | 891 | 984 | 882 | 440 | 398 | 407 | 412 |
| Extra % Emission Reduction | — | — | — | — | 9.5 | 7.5 | 6.4 |

These examples demonstrate that a foam having desirable physical properties and low chemical emissions can be obtained when: a) selecting gelling tertiary amine catalysts having isocyanate reactive functionality from the group of: urea, secondary hydroxyl group and secondary amine; b) selecting an organic di-carboxylic acid according to the invention and c) properly combining a) and b). The results are surprising and unexpected and cannot be just accounted by the amine and acid emissions elimination.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A catalyst for producing a flexible open cell polyurethane foam comprising:

i) a combination of:
  adipic acid; and
  at least one non-emissive and isocyanate reactive tertiary amine gelling catalyst selected from the group consisting of bis(dimethylaminopropyl)amine, dimethylaminoethoxyethanol, dimethylaminopropylurea, N-dimethylaminopropyl-N-(2-hydroxyethyl)-N-methylamine, and N-dimethylaminoethyl-N-(2-hydroxyethyl)-N-methylamine,
  wherein the weight ratio of the at least one gelling catalyst to adipic acid is between 3.33:1 to 5:1; and ii) at least one amine blowing catalyst selected from the group consisting of 2-[N-(dimethylaminoethoxyethyl)-N-methylamino]ethanol, and N,N,N'-trimethyl-N'-3-aminopropyl-bis(aminoethyl) ether,
  wherein the flexible open cell polyurethane foam produced using the catalyst has no tertiary amine or acid emissions according to VDA method 278.

2. The catalyst of claim 1 wherein the catalyst further comprises at least one member selected from the group consisting of N,N-bis(3-dimethylamino-propyl)-N-(2-hydroxypropyl) amine; N,N-dimethyl-N',N'-bis(2-hydroxypropyl)-1,3-propylenediamine; dimethylaminopropylamine (DMAPA); N-methyl-N'-2-hydroxypropyl-piperazine; bis (dimethylaminopropyl) amine, dimethylaminopropyl urea; N,N'-bis(3-dimethylaminopropyl) urea, bis(dimethylamino)-2-propanol, N-(3-aminopropyl)imidazole, N-(2-hydroxypropyl)imidazole, N-(2-hydroxyethylimidazole), N,N'-bis(2-hydroxypropyl) piperazine, N-(2-hydroxypropyl)-morpholine.

3. A catalyst comprising:

i) a combination of:
  adipic acid; and
  at least one tertiary amine catalyst selected from the group consisting of bis(dimethylaminopropyl)amine, dimethylaminoethoxyethanol, dimethylaminopropylurea, N-dimethylaminopropyl-N-(2-hydroxyethyl)-N-methylamine, and N-dimethylaminoethyl-N-(2-hydroxyethyl)-N-methylamine,
  wherein the tertiary amine is substantially free of primary hydroxyl groups; and
  wherein the weight ratio of the at least one tertiary amine catalyst to adipic acid is between 3.33:1 to 5:1; and ii) at least one bis(dimethylaminoethyl)ether.

4. The catalyst of claim 1 further comprising at least one crosslinking agent selected from the group consisting of polyhydric alcohols and polyamines.

5. The catalyst of claim 4 wherein the crosslinking agent comprises diethanolamine.

6. The catalyst of claim 1 wherein the gelling catalyst comprises about 0.25 to about 10 parts by weight and the acid comprises about 0.05 to about 3.0 parts by weight.

7. A catalyst for producing an open celled flexible polyurethane foam comprising:

i) a combination of:

adipic acid; and a solution comprising at least one non-emissive and isocyanate reactive tertiary amine gelling catalyst selected from the group consisting of bis(dimethylaminopropyl)amine, dimethylaminoethoxyethanol, dimethylaminopropylurea, N-dimethylaminopropyl-N-(2-hydroxyethyl)-N-methylamine, and N-dimethylaminoethyl-N-(2-hydroxyethyl)-N-methylamine, wherein the weight ratio of the at least one gelling catalyst to adipic acid is between 3.33:1 to 5:1, and ii) at least one amine blowing catalyst selected from the group consisting of 2-[N-(dimethylaminoethoxyethyl)-N-methylamino]ethanol, and N,N,N'-trimethyl-N'-3-aminopropyl-bis(aminoethyl) ether, wherein the foam produced using the catalyst has no tertiary amine or acid emissions according to VDA method 278.

8. The catalyst of claim 7 wherein the solution comprises at least one of glycols and diols.

9. A catalyst for producing an open celled flexible polyurethane foam comprising:

i) a combination of:

adipic acid; and at least one non-emissive and isocyanate reactive tertiary amine gelling catalyst selected from the group consisting of bis(dimethylaminopropyl)amine, dimethylaminoethoxyethanol, dimethylaminopropylurea, N-dimethylaminopropyl-N-(2-hydroxyethyl)-N-methylamine, and N-dimethylaminoethyl-N-(2-hydroxyethyl)-N-methylamine, wherein the weight ratio of the at least one gelling catalyst to adipic acid is between 3.57:1 to 5:1, and wherein the tertiary amine is substantially free of primary hydroxyl groups; and i) a solution comprising at least one amine blowing catalyst selected from the group consisting of 2-[N-(dimethylaminoethoxyethyl)-N-methylamino]ethanol, and N,N,N'-trimethyl-N'-3-aminopropyl-bis(aminoethyl) ether, wherein the foam produced using the catalyst has no tertiary amine or acid emissions according to VDA method 278.

* * * * *